United States Patent
Kononiuk

(10) Patent No.: US 8,959,786 B2
(45) Date of Patent: Feb. 24, 2015

(54) PEDAL MEASUREMENT GAUGE

(71) Applicant: Toyota Motor Engineering & Manufacturing North America, Inc., Erlanger, KY (US)

(72) Inventor: Jacob Seth Kononiuk, Allenford (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 218 days.

(21) Appl. No.: 13/660,053

(22) Filed: Oct. 25, 2012

(65) Prior Publication Data

US 2014/0115909 A1  May 1, 2014

(51) Int. Cl.
| | |
|---|---|
| G01B 3/10 | (2006.01) |
| G01B 5/00 | (2006.01) |
| G01B 3/22 | (2006.01) |
| G01B 5/14 | (2006.01) |
| G01B 3/08 | (2006.01) |
| G01D 21/00 | (2006.01) |

(52) U.S. Cl.
CPC .................................. *G01B 5/14* (2013.01)
USPC ................... 33/701; 33/833; 33/809; 33/806; 33/609

(58) Field of Classification Search
CPC ........ G01B 5/0025; G01B 5/14; G01B 5/207; G01B 5/255; B21D 1/14
USPC ................... 33/701, 833, 600, 809, 806, 609, 33/480–484
See application file for complete search history.

(56) References Cited

U.S. PATENT DOCUMENTS

| 3,824,847 | A | 7/1974 | Chambers |
| 7,604,303 | B2 * | 10/2009 | Cole et al. ..................... 303/191 |
| 8,701,304 | B2 * | 4/2014 | Conley et al. ................... 33/600 |
| 2011/0248705 | A1 | 10/2011 | Matsumoto et al. |

FOREIGN PATENT DOCUMENTS

KR  101239759 B1 * 10/2011

* cited by examiner

*Primary Examiner* — Peter Macchiarolo
*Assistant Examiner* — Rhyan C Lange
(74) *Attorney, Agent, or Firm* — Christopher G. Darrow; Young Basile Hanlon & MacFarlane, P.C.

(57) ABSTRACT

An apparatus and method for measuring pedal distances within a vehicle. The apparatus includes a first block for engaging an accelerator pedal. The first block includes a first receptacle for receiving a first measurement device and a second receptacle including slidable and rotatable engagement for receiving a second measurement device. The first measurement device measures pedal stroke and the second measurement device measures distance. The apparatus further includes a second block for engaging a brake pedal. The second block includes a receptacle including slidable engagement for receiving a third measurement device. The third measurement device measures distance, either between pedals or between a pedal and a reference surface in the vehicle.

16 Claims, 8 Drawing Sheets

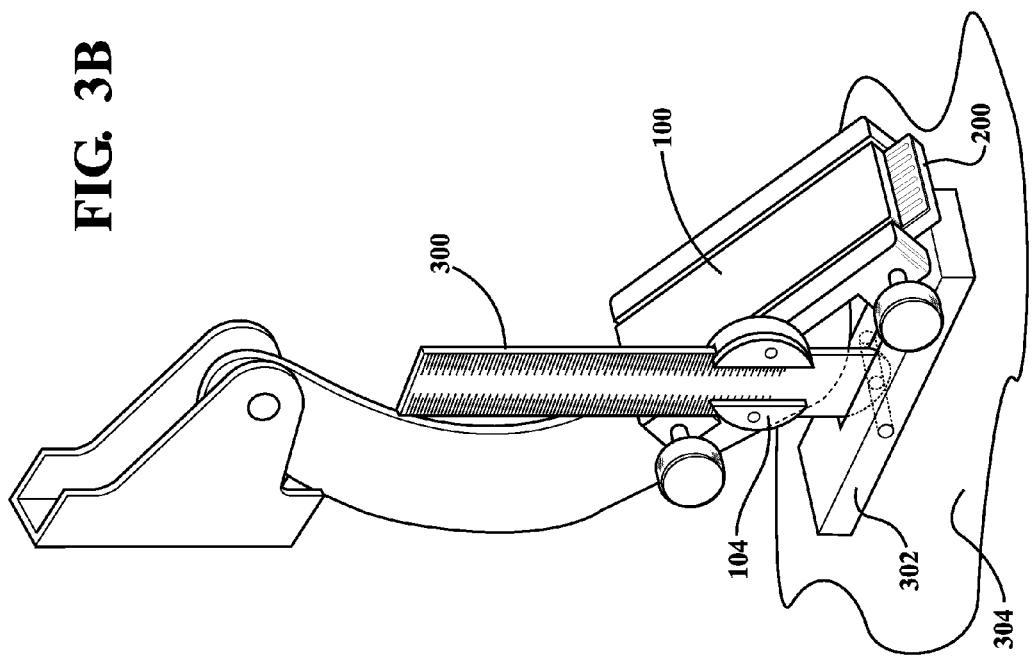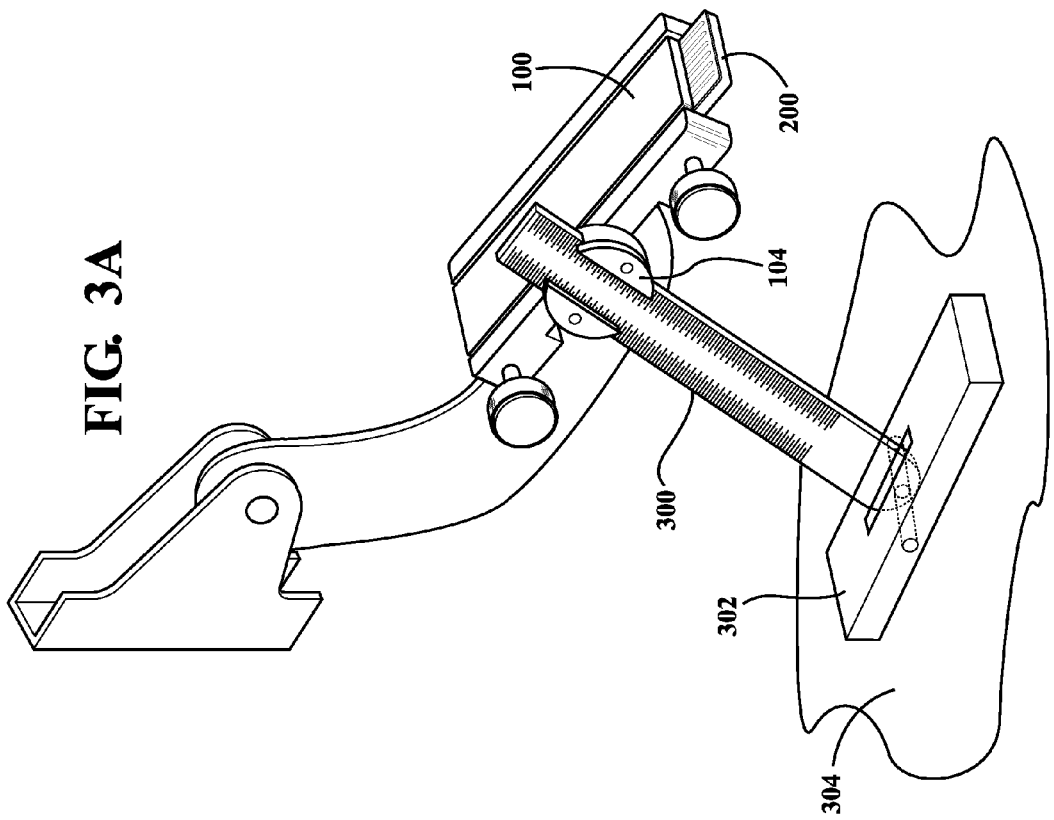

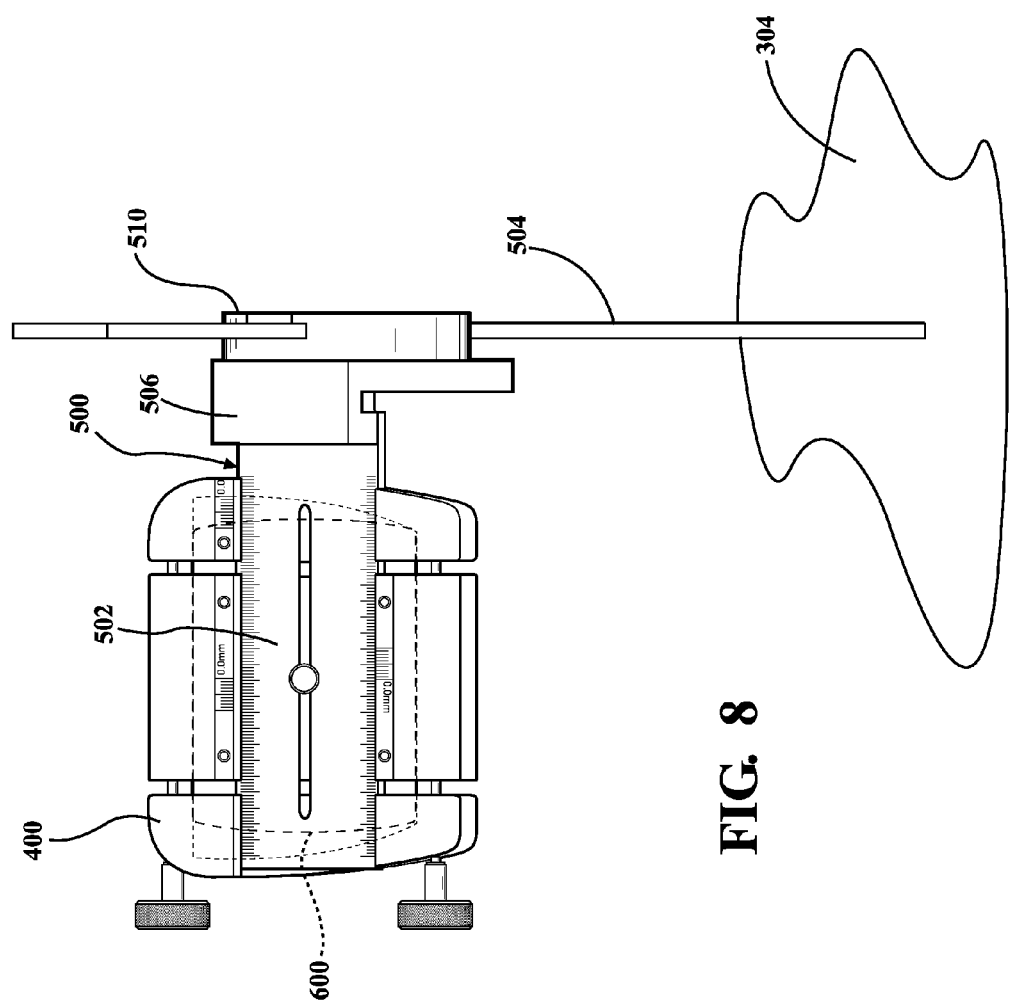

PEDAL MEASUREMENT GAUGE

BACKGROUND

The vehicle manufacturing process includes a variety of safety inspections, or audits, for multiple vehicle components. One such inspection is an audit of pedal stroke, pedal position, and pedal gap to confirm that pedal location meets the tolerances required by safety regulations. The inspection can also verify pedal location to assist the auditor in confirming a lack of manufacturing or build process defects.

SUMMARY

An apparatus and methods for measuring pedal location and pedal stroke within a vehicle are disclosed.

One aspect of the disclosed embodiments is a gauge for measuring pedal location and pedal stroke within a vehicle. The gauge includes a first block for engaging an accelerator pedal. The first block includes a first receptacle for receiving a first measurement device. The first measurement device can measure pedal stroke. The first block also includes a second receptacle with slidable and rotatable engagement for receiving a second measurement device. The second measurement device can measure distance. The gauge also includes a second block for engaging a brake pedal. The second block includes a receptacle with slidable engagement for receiving a third measurement device. The third measurement device can measure distance.

Another aspect of the disclosed embodiments is a method for measuring pedal distance. The method includes engaging a block to a pedal. The block includes a receptacle with slidable and rotatable engagement for receiving a measurement device. The method further includes engaging and sliding the measurement device in the receptacle to a position abutting a vehicle surface and collecting a first measurement from the measurement device. The method further includes moving the pedal from a first position to a second position, and, after moving the pedal, collecting a second measurement from the measurement device.

Another aspect of the disclosed embodiments is a method for measuring pedal gap. The method includes engaging a first block to a first pedal. The first block includes a receptacle with slidable engagement for receiving a measurement device. The method also includes engaging a second block to a second pedal. The second block includes an indicator denoting the center of the second pedal. The method also includes engaging and sliding the measurement device within the receptacle of the first block to a position abutting the indicator on the second block and collecting a measurement from the measurement device.

BRIEF DESCRIPTION OF THE DRAWINGS

The description herein makes reference to the accompanying drawings wherein like reference numerals refer to like parts throughout the several views, and wherein:

FIGS. 3A and 3B are schematic illustrations of an example method for measuring pedal distance using the block of FIG. 1;

FIG. 8 is another schematic illustration of an example method for measuring pedal distance using the block of FIG. 4 and the measurement device of FIG. 5.

DETAILED DESCRIPTION

Traditional methods for measuring vehicle pedal stroke, the rotational distance traveled by a pedal, pedal distance from reference surfaces, and pedal gap, the distance between pedals, are cumbersome. Several different measurement devices must be used by an auditor in an environment where reading and positioning devices is difficult, that is, underneath the steering wheel of a vehicle. The measurement devices, such as rulers, scales, calipers, inclinometers, and other devices capable of measuring distances, can be easily dropped and misread by the auditor. Further, the auditor can struggle to accurately position the measurement devices with repeated precision between vehicles being audited.

An apparatus and methods for measuring pedal distance in a vehicle using blocks to engage the accelerator pedal and brake pedal as well as receptacles on the blocks to receive measurement devices capable of measuring pedal stroke, pedal gap, and the distance from a pedal to a reference surface are disclosed here.

Figure 1:
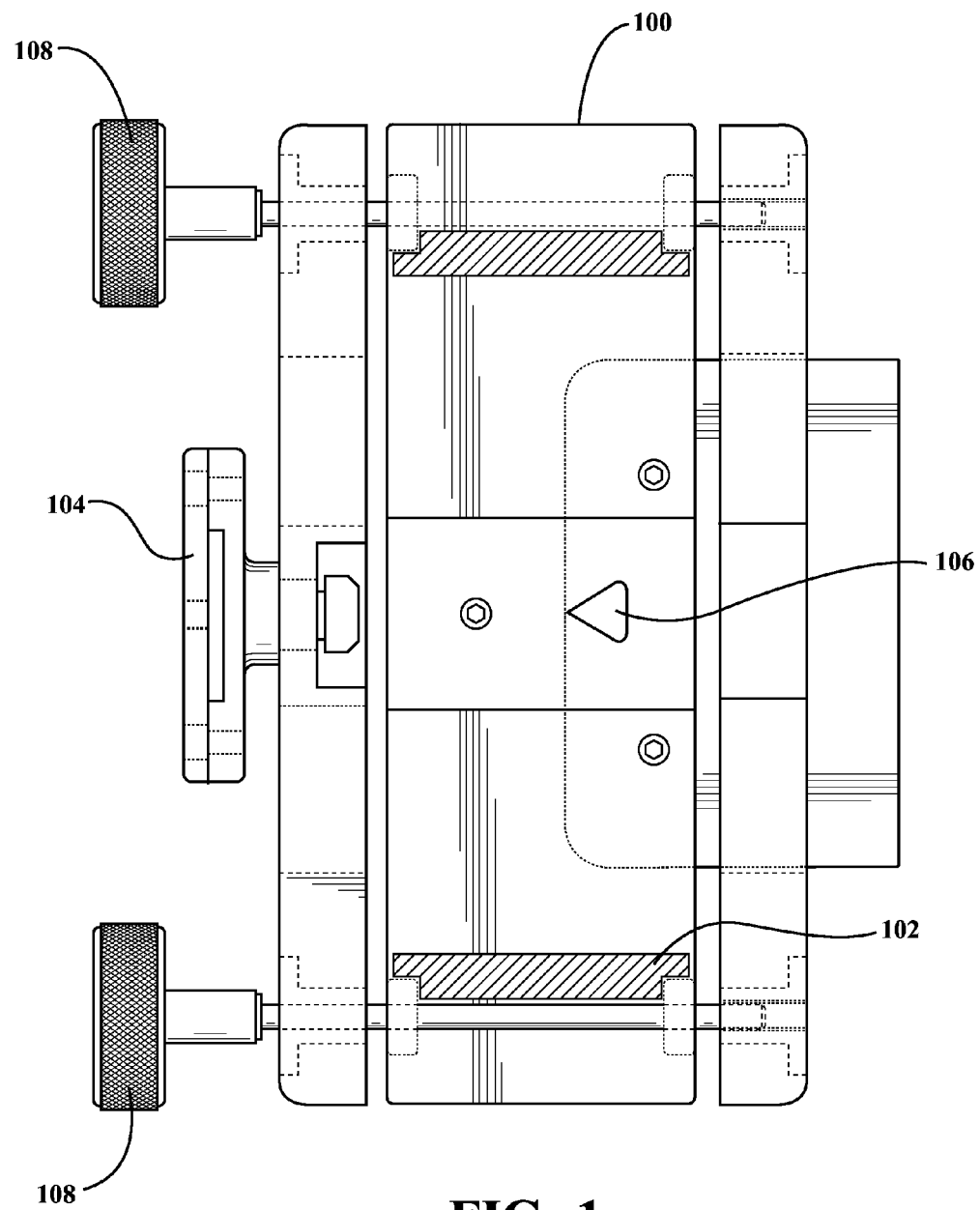
FIG. 1 is a schematic top perspective view of a block for engaging an accelerator pedal in accordance with one or more embodiments.

FIG. 1 is a schematic top perspective view of an accelerator block 100 for engaging an accelerator pedal. The accelerator block 100 includes a first receptacle 102 for receiving a first measurement device. The first measurement device can be engaged to the first receptacle 102 to measure the angular rotation of the accelerator pedal moving from one fixed position to another, and is further described in FIG. 2 below. The receptacle 102 can include snap-fit engagement means, magnetic engagement means, or any other engagement means. The accelerator block 100 can also include a second receptacle 104 having slidable and rotatable engagement for receiving a second measurement device. The second measurement device can be engaged to the second receptacle to measure the distance between the accelerator pedal and a reference surface, and is further described in FIGS. 3A-3B below.

The accelerator block 100 can also include an indicator 106 denoting the center of the accelerator pedal. The accelerator block 100 can be positioned on the face of the accelerator pedal using a pair of turn-screws 108, or any other means suitable for positioning and securing the accelerator block 100 to the accelerator pedal. The turn-screws 108 are designed such that tightening the accelerator block 100 onto the accelerator pedal will properly place the indicator 106 at the center of the accelerator pedal. Additionally, the indicator 106 can be designed to be removable to allow for engagement of the first measurement device, or can be positioned such that the first measurement device does not interfere with the indicator 106 when engaged in the first receptacle 102.

Figure 2:
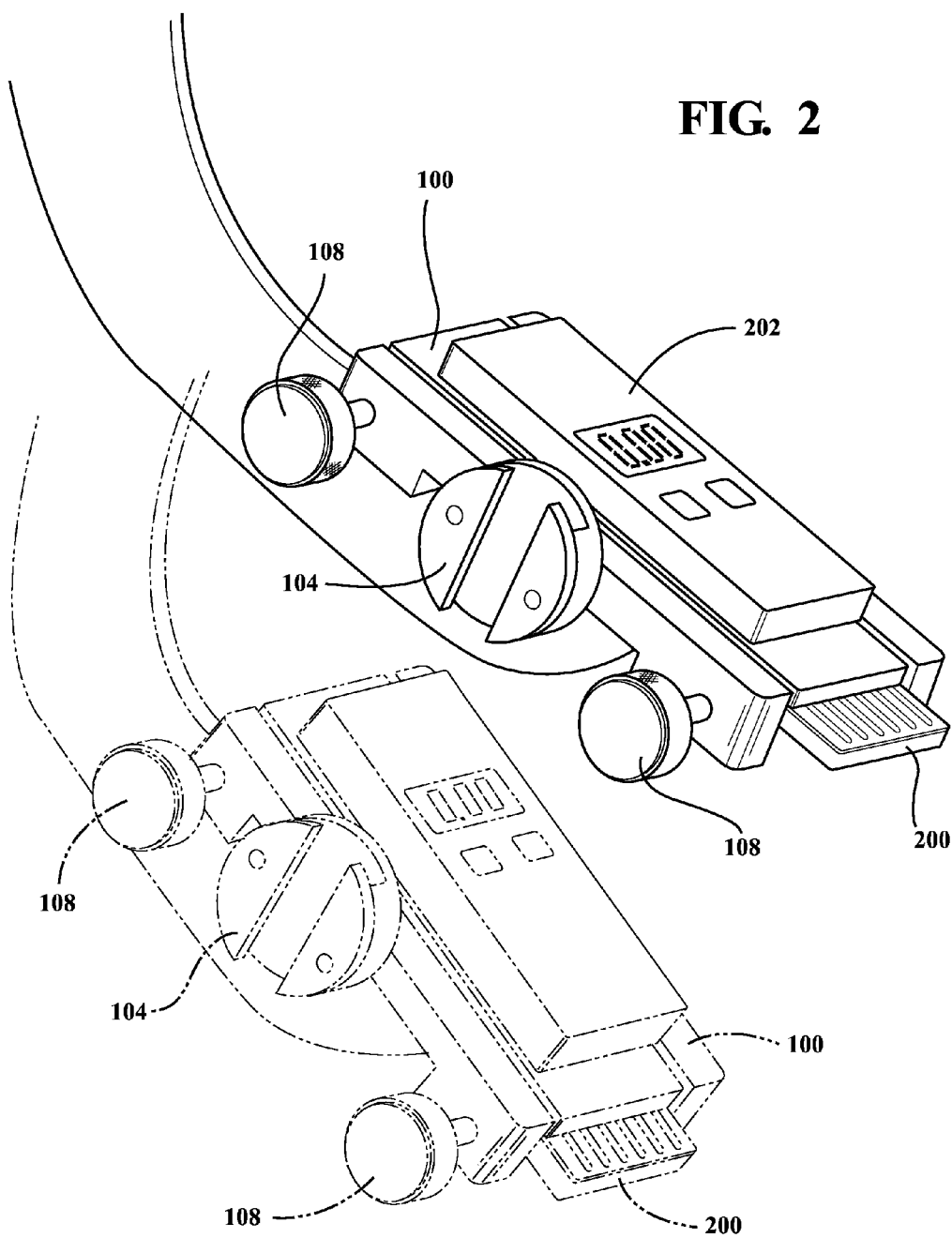
FIG. 2 is a schematic illustration of an example method of measuring pedal stroke using the block of FIG. 1.

FIG. 2 is a schematic illustration of an example method of measuring pedal stroke using the accelerator block 100 of FIG. 1. The schematic shows an accelerator pedal 200, the accelerator block 100 described in FIG. 1, and a measurement device 202. The measurement device 202 can be an inclinometer used to measure the angular rotation between the accelerator pedal 200 at vehicle idle, the accelerator pedal 200 at wide-open throttle, and the accelerator pedal 200 at a floor stop position, that is, where the accelerator pedal 200 is pressed to the floor of the vehicle.

The method for measuring pedal stroke illustrated in FIG. 2 includes engaging the accelerator block 100 to the accelerator pedal 200, for example by using the turn-screws 108, and engaging the measurement device 202 to the first receptacle 102 on the accelerator block 100. The first receptacle 102 can be designed to receive the measurement device 202. The method further includes actuating the measurement device 202, for example, zeroing the inclinometer at the accelerator pedal 200 idle position, and then moving the accelerator pedal 200 from the idle position to a second position, for example, wide-open throttle position. At the second position a measurement reading can be collected from the measurement device 202. The accelerator pedal 200 can then be moved from the second position to a third position, for example, floor stop position. At the third position, another measurement reading can be collected from the measurement device 202.

By engaging the measurement device 202 to the accelerator block 100, the auditor can more easily move within the space under the steering wheel since he does not need to hold the measurement device 202 on the accelerator pedal 200. If the measurement device 202 is, or is similar to, an electronic inclinometer, the measurement readings can be held on a digital display for reading by the auditor or transmitted automatically upon an indication from the operator that the various positions of the accelerator pedal 200 have been reached. Further, this same method can be implemented on the brake pedal if brake pedal stroke is of interest to the auditor.

FIGS. 3A and 3B are schematic illustrations of an example method for measuring pedal distance using the accelerator block 100 of FIG. 1. The schematic shows the accelerator pedal 200 of FIG. 2, the accelerator block 100 of FIG. 1 attached to the accelerator pedal 200, and the second receptacle 104 attached to the accelerator block 100. The second receptacle 104 has slidable and rotatable engagement as described in FIG. 1. The schematic also shows a measurement device 300 fitted within the second receptacle 104. In this example, the measurement device 300 is a straight scale, e.g. a ruler, designed to pivot both within the second receptacle 104 and within a base 302. The base 302 of the measurement device 300 is positioned against a reference surface 304. The reference surface 304 in this example is the vehicle floor, but other references surfaces 304 are possible, for example the vehicle instrument panel or vehicle console.

The method for measuring pedal distance illustrated in FIGS. 3A and 3B includes engaging the accelerator block 100 to the accelerator pedal 200 and engaging and sliding the measurement device 300 in the receptacle to a position abutting the reference surface 304, in this example, the vehicle floor. The method further includes collecting a first measurement from the measurement device 300, for example, reading the value on the straight scale when the accelerator pedal 200 is in a first position. The first position can be the position of the accelerator pedal 200 at vehicle idle. The example first position approximating vehicle idle is shown in FIG. 3A.

The method of FIGS. 3A and 3B further includes moving the accelerator pedal 200 from the first position to a second position. The second position can be the position of the accelerator pedal 200 at wide-open throttle, or the position of the accelerator pedal 200 at floor stop. The example second position approximating vehicle floor stop is shown in FIG. 3B. The method further includes collecting a second measurement from the measurement device 300 after the accelerator pedal 200 moves to the second position. Using the second receptacle 104 paired with the accelerator block 100 allows the auditor to easily position the measurement device 300 without concern about dropping the measurement device 300 or placing the measurement device 300 in a position that would be difficult to repeat between inspections or audits.

Figure 4:
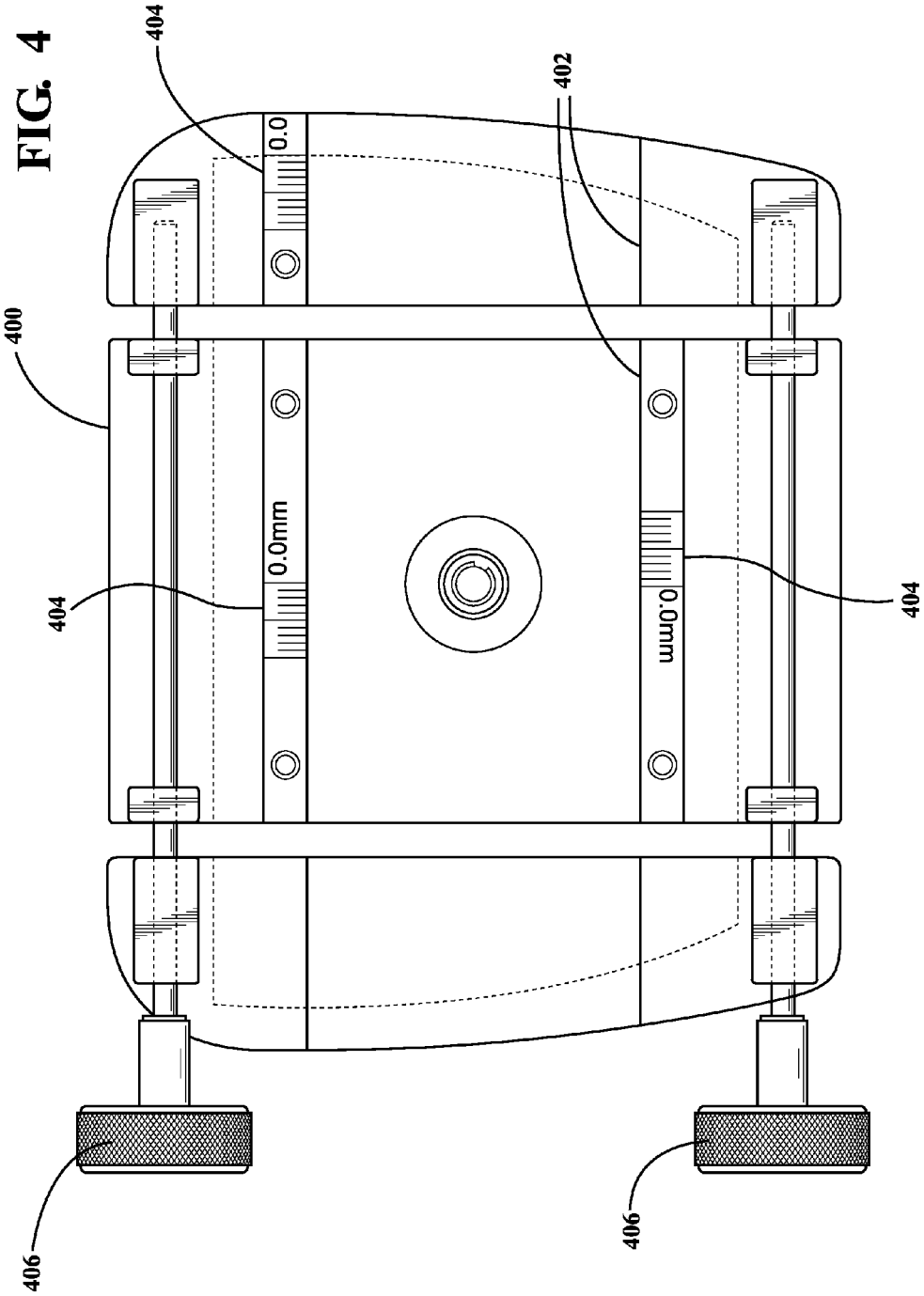
FIG. 4 is a schematic top perspective view of a block for engaging a brake pedal in accordance with one or more embodiments.

FIG. 4 is a schematic top perspective view of a brake block 400 for engaging a brake pedal. The brake block 400 includes a receptacle 402 for receiving a measurement device. The measurement device can be engaged to the receptacle 402 to measure various distances. The receptacle 402 can also include features suitable for measurement. For example, the receptacle 402 can include vernier scale reference features 404 for use with a sliding straight scale, and the measurement device engaged within the receptacle 402 can measure the distance between the brake pedal and accelerator pedal 200, e.g. pedal gap, as described in FIG. 6 below. The measurement device can also measure the distance between the brake pedal and a reference surface 304 as described in FIG. 7 below. The brake block 400 can be positioned on the face of the brake pedal using a pair of turn-screws 406, or any other means suitable for positioning and securing the brake block 400 to the brake pedal. The turn-screws 406 are designed such that tightening the brake block 400 onto the brake pedal will properly center the brake block 400 on the brake pedal.

Figure 5:
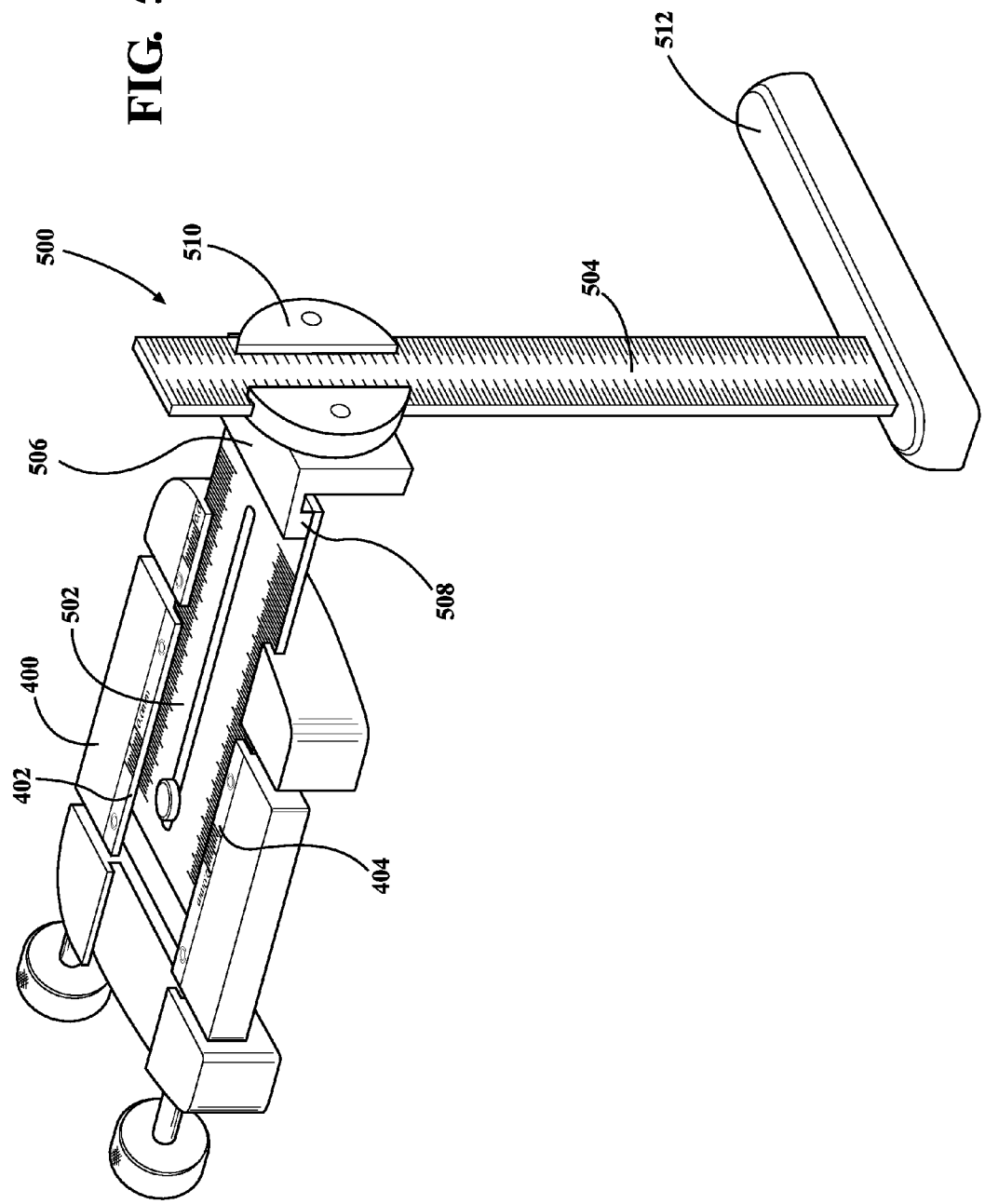
FIG. 5 is a schematic perspective view of a measurement device capable of engagement to the block of FIG. 4.

FIG. 5 is a schematic perspective view of a measurement device 500 capable of being engaged to the brake block 400 of FIG. 4. The brake block 400 is shown as including the receptacle 402 and vernier scale reference features 404 as described in FIG. 4. The measurement device 500 can include a first straight scale 502, a second straight scale 504, and a stanchion 506. The stanchion 506 can include a first receptacle 508 including slidable engagement for receiving the first straight scale 502 and a second receptacle 510 including slidable and rotatable engagement for receiving the second straight scale 504.

The second straight scale 504 can be a traditional straight ruler, or can include both a straight ruler and a base 512. The second straight scale 504 can be sized to measure the gap between pedals or to measure the distance between a pedal and a reference surface 304. Additionally, the stanchion 506 can be used with a variety of lengths or styles of the second straight scale 504, depending on the measurement being recorded. The measurement device 500 described in FIG. 5 is versatile in that it gives the auditor a fixture, or gauge, for use with different lengths of the second straight scale 504 as well as the ability to have his hands free when using both the first straight scale 502 and the second straight scale 504 together to take measurements.

Figure 6:
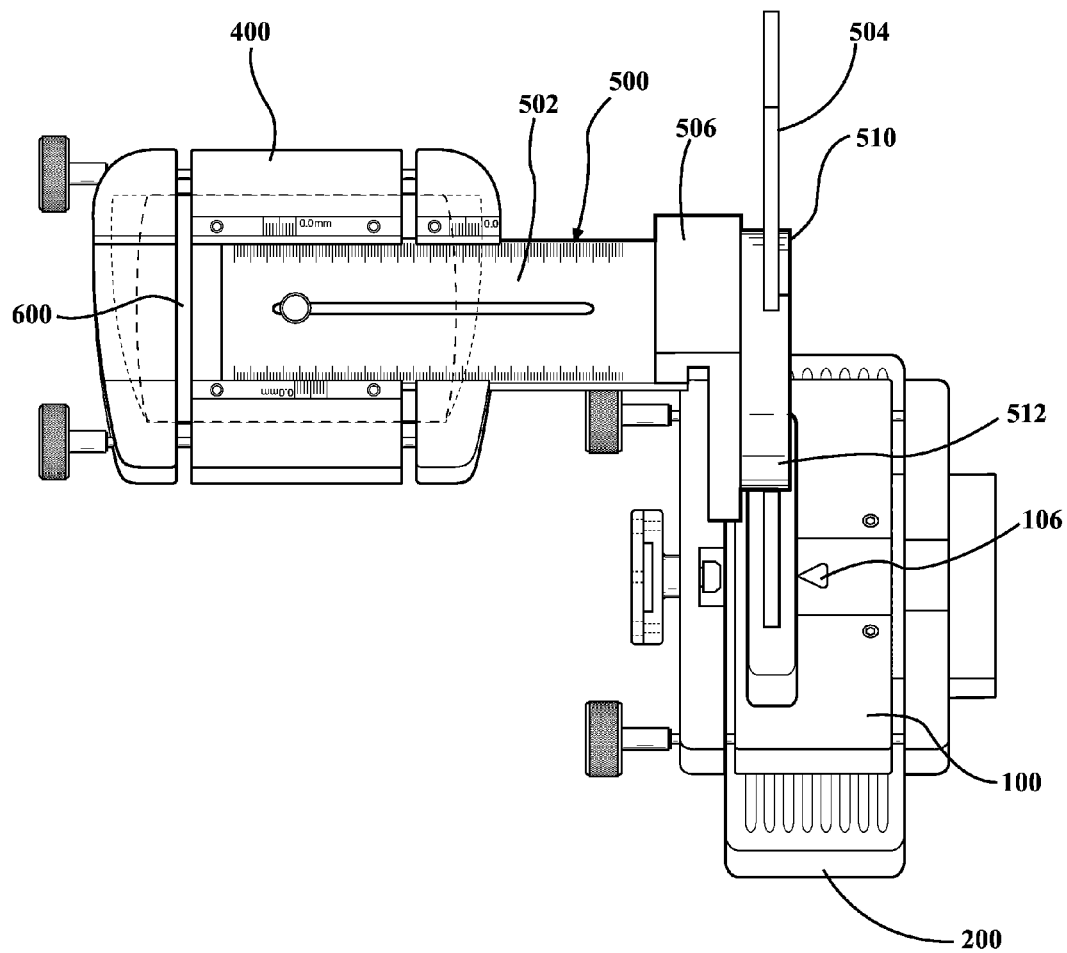
FIG. 6 is a schematic illustration of an example method for measuring pedal distance using the block of FIG. 4 and the measurement device of FIG. 5.

FIG. 6 is a schematic illustration of an example method for measuring pedal distance using the brake block 400 of FIG. 4 and the measurement device 500 of FIG. 5. The schematic shows the accelerator block 100 of FIG. 1, the accelerator pedal 200 of FIG. 2, the brake block 400 of FIG. 4, the measurement device 500 of FIG. 5, and a brake pedal 600. The brake block 400 can be engaged to the brake pedal 600. The accelerator block 100 can be engaged to the accelerator pedal 200. The measurement device 500 can be slidably engaged to the brake block 400. In this example, the measurement device 500 includes the first straight scale 502, the stanchion 506, and the second straight scale 504 engaged slidably and rotatably to the stanchion 506. The base 512 of the second straight scale 504 can be positioned against the indicator 106 denoting the center of the accelerator pedal 200.

The method for measuring pedal distance illustrated in FIG. 6 includes engaging the brake block 400 to the brake pedal 600. The brake block 400 includes a receptacle 402 (not shown in this view) including slidable engagement for receiving a measurement device 500. The method further includes engaging an accelerator block 100 to an accelerator pedal 200. The accelerator block 100 includes an indicator 106 denoting the center of the accelerator pedal 200. Both the accelerator block 100 and brake block 400 can be engaged using the turn-screws 108, 406 described in FIGS. 1 and 4, respectively.

The method illustrated in FIG. 6 further includes engaging and sliding the measurement device 500 within the receptacle 402 (not shown) of the brake block 400 to a position abutting the indicator 106 on the accelerator block 100. The measurement device 500 can be engaged to the brake block 400 by sliding the first straight scale 502 into the receptacle 402. The measurement device 500 can be positioned against the indicator 106 on the accelerator block 100 by sliding the second straight scale 504 within the second receptacle 510 such that the base 512 of the second straight scale 504 sits on the accelerator block 100 adjacent to the indicator 106. The method further includes collecting a measurement from the measurement device 500.

The measurement collected can include the distance indicated by the first straight scale 502. The first straight scale 502 can be a vernier scale or other type of straight scale. This measurement is the distance between the center of the brake pedal 600 and the center of the accelerator pedal 200. The measurement collected can also include the distance indicated by the second straight scale 504. The second straight scale 504 can also be a vernier scale or other type of straight scale. This measurement is the vertical distance between the face of the brake pedal 600 and the face of the accelerator pedal 200.

Figure 7:
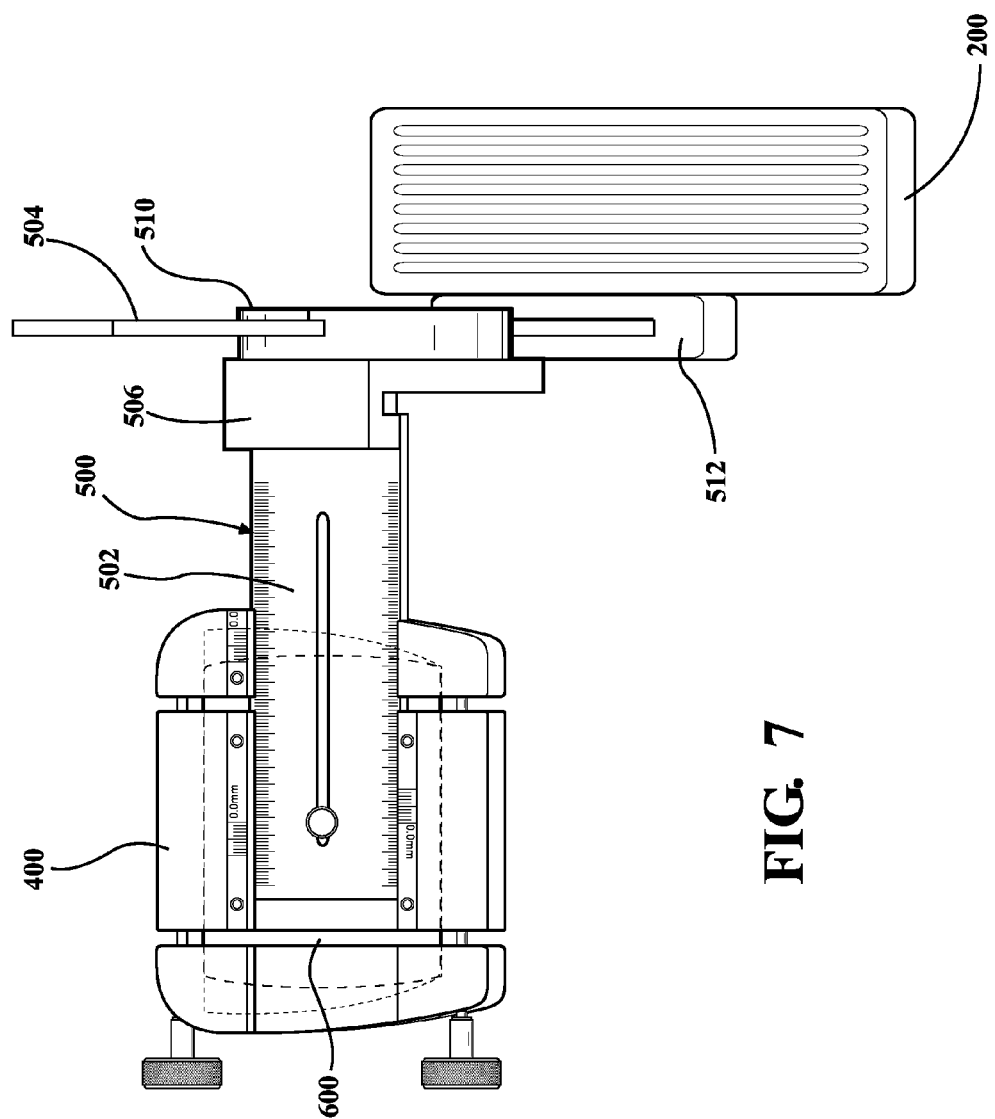
FIG. 7 is another schematic illustration of an example method for measuring pedal distance using the block of FIG. 4 and the measurement device of FIG. 5.

FIG. 7 is another schematic illustration of an example method for measuring pedal distance using the brake block 400 of FIG. 4 and the measurement device 500 of FIG. 5. The schematic shows the accelerator pedal 200 of FIG. 2, the brake block 400 of FIG. 4, the measurement device 500 of FIG. 5, and the brake pedal 600 of FIG. 6. The brake block 400 can be engaged to the brake pedal 600. The measurement device 500 can be slidably engaged to the brake block 400. In this example, the measurement device 500 includes the first straight scale 502, the stanchion 506, and the second straight scale 504 engaged slidably and rotatably to the stanchion 506.

In the method illustrated in FIG. 7, the first straight scale 502 can be extended from the brake pedal 600 to the side edge of the accelerator pedal 200 closest to the brake pedal 600. The second straight scale 504 can slide within the second receptacle 510 so that the base 512 of the second straight scale 504 abuts the side edge of the accelerator pedal 200 closest to the brake pedal 600. The measurement collected can be the distance indicated by the first straight scale 502. This measurement can be the distance between the center of the brake pedal 600 and the side edge of the accelerator pedal 200 or the distance between a side edge of the brake pedal 600 and the side edge of the accelerator pedal 200.

FIG. 8 is another schematic illustration of an example method for measuring pedal distance using the brake block of FIG. 4 and the measurement device 500 of FIG. 5. The schematic shows the brake block 400 of FIG. 4, the measurement device 500 of FIG. 5, and the brake pedal 600 of FIG. 6. The brake block 400 can be engaged to the brake pedal 600. The measurement device 500 can be slidably engaged to the brake block 400. In this example, the measurement device 500 includes the first straight scale 502, the stanchion 506, and a second straight scale 504 engaged slidably and rotatably to the stanchion 506. The second straight scale 504 can be positioned against a reference surface 304. The reference surface 304 in this example is the vehicle floor, but other references surfaces are possible, for example the vehicle instrument panel or vehicle console.

In the method illustrated in FIG. 8, the first straight scale 502 can be extended from the brake pedal 600 to leave sufficient space for the auditor to operate the second straight scale 504. The second straight scale 504 can slide within the second receptacle 510 to a position abutting the reference surface 304, in this example, the vehicle floor. The measurement collected can be the distance indicated by the second straight scale 504. Using the second receptacle 510 allows the auditor to easily position the second straight scale 504 without concern about dropping the measurement device 500 or placing the measurement device 500 in a position that would be difficult to repeat between inspections or audits.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A gauge for measuring pedal distances within a vehicle comprising:
   a first block for engaging an accelerator pedal, comprising:
   a first receptacle for receiving a first measurement device, wherein the first measurement device measures pedal stroke;
   a second receptacle including slidable and rotatable engagement for receiving a second measurement device, wherein the second measurement device measures distance between the accelerator pedal and one of a vehicle floor and a vehicle instrument panel.

2. The gauge of claim 1 wherein the first measurement device is an inclinometer.

3. The gauge of claim 1 wherein the second measurement device is a straight ruler.

4. The gauge of claim 1, further comprising:
   a second block for engaging a brake pedal, comprising:
   a receptacle including slidable engagement for receiving a third measurement device, wherein the third measurement device measures distance between the brake pedal and accelerator pedal and distance between the brake pedal and one of the vehicle floor and the vehicle instrument panel.

5. The gauge of claim 4 wherein the third measurement device includes:
   a first straight scale;
   a second straight scale; and
   a stanchion, comprising:
      a first receptacle including slidable engagement for receiving the first straight scale; and
      a second receptacle including slidable and rotatable engagement for receiving the second straight scale.

6. The gauge of claim 5 wherein the second straight scale measures distance between the brake pedal and one of the vehicle floor and the vehicle instrument panel.

7. A method for measuring pedal distances, comprising:
   engaging a block to a pedal, wherein the block includes a receptacle including slidable and rotatable engagement for receiving a measurement device;

engaging and sliding the measurement device in the receptacle to a position abutting one of a vehicle floor and a vehicle instrument panel;
collecting a first measurement from the measurement device;
moving the pedal from a first position to a second position; and
after moving the pedal, collecting a second measurement from the measurement device.

8. The method of claim 7 wherein the measurement device is a straight scale.

9. The method of claim 7, further comprising:
moving the pedal from the second position to a third position; and
after moving the pedal, collecting a third measurement from the measurement device.

10. A method for measuring pedal distances, comprising:
engaging a first block to a first pedal, wherein the first block includes a receptacle including slidable engagement for receiving a measurement device, the measurement device including:
a first straight scale;
a second straight scale; and
a stanchion, the stanchion comprising:
a first receptacle including slidable engagement for receiving the first straight scale; and
a second receptacle including slidable and rotatable engagement for receiving the second straight scale;
engaging a second block to a second pedal, wherein the second block is separate from the measurement device and includes an indicator denoting the center of the second pedal;
engaging and sliding the measurement device within the receptacle of the first block to a position abutting the indicator on the second block; and
collecting a measurement from the measurement device.

11. The method of claim 10 wherein the first straight scale extends from the first pedal to the indicator on the second block and the measurement is the horizontal distance between the first pedal and the center of the second pedal.

12. The method of claim 10 wherein the first straight scale extends from the first pedal to an edge of the second pedal and the measurement is the horizontal distance between the first pedal and the edge of the second pedal.

13. The method of claim 10 wherein the second straight scale extends in a manner perpendicular to the first straight scale and the measurement is the vertical distance between the first pedal and the second pedal.

14. The method of claim 10 wherein the second straight scale extends in a manner perpendicular to the first straight scale and the measurement is the vertical distance between the first pedal and a reference surface.

15. The method of claim 14 wherein the reference surface is a vehicle floor.

16. The method of claim 14 wherein the reference surface is a vehicle instrument panel.

* * * * *